United States Patent [19]

Tom et al.

[11] Patent Number: 4,853,148

[45] Date of Patent: Aug. 1, 1989

[54] PROCESS AND COMPOSITION FOR DRYING OF GASEOUS HYDROGEN HALIDES

[75] Inventors: Glenn M. Tom, New Milford; Duncan W. Brown, Wilton, both of Conn.

[73] Assignee: Advanced Technology Materials, Inc., New Milford, Conn.

[21] Appl. No.: 29,631

[22] Filed: Mar. 24, 1987

[51] Int. Cl.$^4$ .............................................. C09K 3/00
[52] U.S. Cl. ................................. 252/194; 252/181.6; 252/181.7; 34/80; 34/DIG. 1; 423/240
[58] Field of Search .......... 252/194 APS, 181.6 APS, 252/181.7 APS; 34/80, DIG. 1; 423/240 S, 240 R; 502/35, 169

[56] References Cited

U.S. PATENT DOCUMENTS

| | | | |
|---|---|---|---|
| 3,067,009 | 12/1962 | Murib et al. | 423/488 X |
| 3,146,061 | 8/1964 | Murib et al. | 423/240 |
| 3,997,652 | 12/1976 | Teller | 423/240 SX |
| 4,603,148 | 7/1986 | Tom | 521/31 |

FOREIGN PATENT DOCUMENTS 2090841 7/1982 United Kingdom.

OTHER PUBLICATIONS

CRC Handbook of Chemistry and Physics, 62nd Ed., CRC Press, Inc., Boca Raton, Fla., 1981, pp. B-73, B-86, B-87, B-113, B-114, B-115, B-116.

*Primary Examiner*—John F. Terapane
*Assistant Examiner*—Gary Geist
*Attorney, Agent, or Firm*—Steven J. Hultquist

[57] ABSTRACT

A process for drying a gaseous hydrogen halide of the formula HX, wherein X is selected from the group consisting of bromine, chlorine, fluorine, and iodine, to remove water impurity therefrom, comprising:

contacting the water impurity-containing gaseous hydrogen halide with a scavenger including a support having associated therewith one or more members of the group consisting of:
 (a) an active scavenging moiety selected from one or more members of the group consisting of:
  (i) metal halide compounds dispersed in the support, of the formula $MX_y$; and
  (ii) metal halide pendant functional groups of the formula $-MX_{y-1}$ covalently bonded to the support,
  wherein M is a y-valent metal, and y is an integer whose value is from 1 to 3;
 (b) corresponding partially or fully alkylated compounds and/or pendant functional groups, of the metal halide compounds and/or pendant functional groups of (a);

wherein the alkylated compounds and/or pendant functional groups, when present, are reactive with the gaseous hydrogen halide to form the corresponding halide compounds and/or pendant functional groups of (a); and M being selected such that the heat of formation, $\Delta H_f$ of its hydrated halide, $MX_y \cdot (H_2O)_n$, is governed by the relationship:

$\Delta H_f \geq n \times 10.1$ kilocalories/mole of such hydrated halide compound wherein n is the number of water molecules bound to the metal halide in the metal halide hydrate.

Also disclosed is an appertaining scavenger composition and a contacting apparatus wherein the scavenger is deployed in a bed for contacting with the water impurity-containing gaseous hydrogen halide.

9 Claims, 1 Drawing Sheet

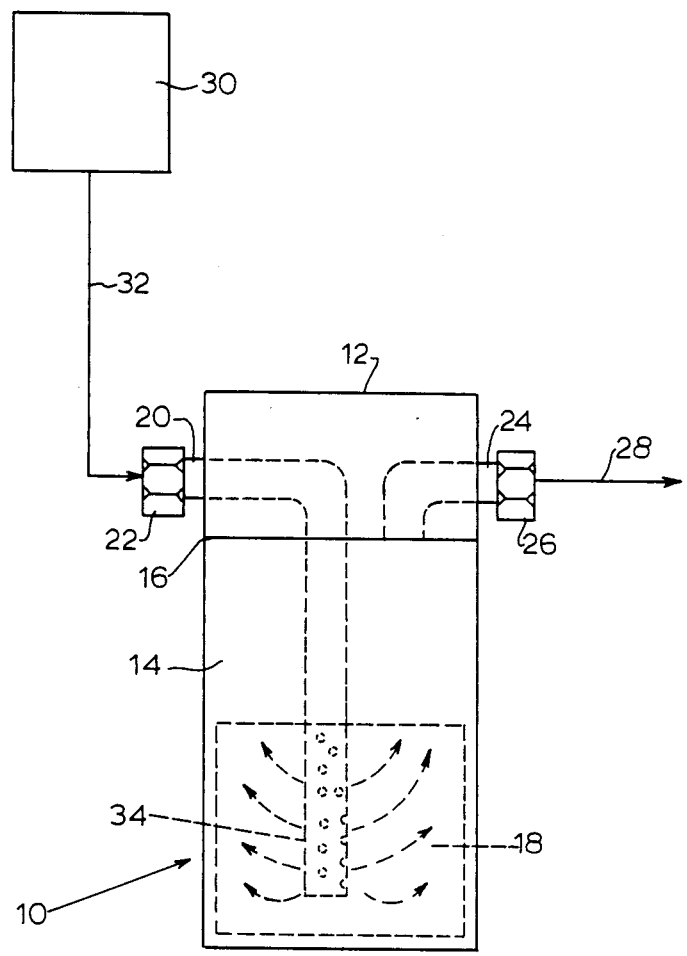

PROCESS AND COMPOSITION FOR DRYING OF GASEOUS HYDROGEN HALIDES

BACKGROUND OF THE INVENTIONS

1. Field of the Invention

This invention relates generally to a process and composition for drying gaseous hydrogen halides to remove water impurity therefrom.

2. Description of the Related Art

In numerous industrial and commercial processes, it is desirable to provide gaseous hydrogen halides as high purity, anhydrous materials.

One area in which high purity hydrogen halides are required in essentially completely water-free form is in semiconductor manufacturing operations.

One example, hydrogen chloride is used in semiconductor manufacturing operations for cleaning reactor tubes and susceptors, and as an etchant for the manufacture of microcircuitry devices.

In such applications, highly efficient water vapor removal is required to be carried out on the gaseous hydrogen chloride before its introduction to the end-use environment. Water-containing hydrogen chloride gas is highly corrosive in character, and thus will necessitate frequent replacement of piping, manifolds, valves, etc., with which it comes into contact. In cleaning susceptors, i.e., the support structures on which wafers are processed, the presence of water in the gaseous hydrogen chloride will result in the formation of new oxides on the susceptor, thus opposing the cleaning function which is sought to be carried out. In etching applications, water-containing hydrogen chloride is a source of undesirable moisture contamination in the semiconductor manufacturing environment, which may render the microcircuitry chip products made in such environment deficient or even useless for their intended purpose.

Among the methods which have been utilized by the prior art for removing water from hydrogen chloride is the use of moisture-sorptive molecular sieves. The difficulty of employing such method for production of high-purity hydrogen chloride is that hydrogen chloride is competitive with water for the absorption sites on the molecular sieves. As a result, it is not possible to obtain the necessary lower residual water values, on the order of part per million by volume concentrations and less, in the effluent from the molecular sieve contacting step.

Hydrogen chloride has also been treated with sulfuric acid or phosphoric acid to produce dehydrated hydrogen chloride. Such dehydration methods, however, have the associated disadvantage that they add sulfur or phosphorous to the hydrogen chloride, and these added elements are highly undesirable contaminants in the aforementioned semiconductor manufacturing applications.

Hydrogen bromide is another example of a hydrogen halide which is required in essentially completely water-free condition in the semiconductor manufacturing field. Hydrogen bromide is used in the electronics industry as an etchant for wafers, and as a cleaning agent for susceptors. In these applications, the presence of water impurity in the hydrogen bromide will result in the same disadvantages noted hereinabove in connection with hydrogen chloride in similar applications. In addition, when hydrogen bromide is used as an etchant for wafers, hazing has been found to result when the hydrogen bromide contains even minute amounts of water vapor.

The art has attempted to achieve removal of water from hydrogen bromide by the use of phosphoric acid as a drier. This method, while generally useful to remove the water contaminant, nontheless has the attendant disadvantage that it adds phosphorous to the hydrogen bromide, which as indicated above in connection with hydrogen chloride, is a significant contaminant in the semiconductor manufacturing process.

Similar disadvantages attend the use of other hydrogen halides in these electronics applications.

Japanese Kokai Tokkyo Koho JP 60/222,127 discloses the thermo decomposition of trimethylaluminum to deposit elemental aluminum on a glass substrate, e.g. glass beads, following which the aluminum coating is reacted in arsine to form a scavenger for water and oxygen. Such method is not useful in application to the drying of gaseous hydrogen halides, however, since free arsine would be formed as a reaction product of the scavenger with the hydrogen halide, and would contaminate the dried gas stream.

Accordingly, it is an object of the present invention to provide a highly efficient composition and process for removal of water vapor impurity from gaseous hydrogen halides.

It is a further object of the invention to provide a composition and process of the above type, having a high capacity for water removal, and capable of reducing the water content of the treated hydrogen halide stream to levels on the order of 1 part per million by volume, and less.

Other objects and advantages of the invention will be more fully apparent from the ensuing disclosure and appended claims.

SUMMARY OF THE INVENTION

In one aspect, the invention relates to a process for drying a gaseous hydrogen halide of the formula HX, wherein X is selected from the group consisting of bromine, chlorine, fluorine, and iodine, to remove water impurity therefrom, comprising:

contacting the water impurity-containing gaseous hydrogen halide with a scavenger including a support having associated therewith one or more members of the group consisting of:

(a) an active scavenging moiety selected from one of more members of the group consisting of:
  (i) metal halide compounds dispersed in the support, of the forumla $MX_y$; and
  (ii) metal halide pendant functional groups of the formula $-MX_{y-1}$ covalently bonded to the support, wherein M is a y-valent metal; and y is an integer whose value is from 1 to 3;
(b) corresponding partially or fully alkylated compounds and/or pendant functional groups, of the metal halide compounds and/or pendant functional groups of (a);

wherein the alkylated compounds and/or pendant functional groups, when present, are reactive with the gaseous hydrogen halide to form the corresponding halide compounds and/or functional groups of (a); and M being selected such that the heat of formation, $\Delta H_f$ of its hydrated halide, $MX_y \cdot (H_2 2O)_n$, is governed by the relationship:

$\Delta H_f \geq n \times 10.1$ kilocalories/mole of such hydrated halide compound wherein n is the number of water molecules bound to the metal halide in the metal halide hydrate.

In another aspect, the invention relates to a scavenger, having utility for drying a gaseous hydrogen halide of the formula HX, wherein X is bromine, chlorine, or iodine, to remove water impurity therefrom, comprising:

(A) a support; and
(B) associated with said support one or more members of the group consisting of:
 (a) an active scavenging moiety selected from one or more members of the group consisting of:
  (i) metal halide compounds dispersed in the support, of the formula $MX_y$; and
  (ii) metal halide pendant functional groups of the formula $-MX_{y-1}$ covalently bonded to the support, wherein M is a y-valent metal; and y is an integer whose value is from 1 to 3;
 (b) corresponding partially or fully alkylated compounds and/or pendant functional groups, of the metal halide compounds and/or pendant functional groups of (a);
wherein the alkylated compounds and/or pendant functional groups, when present, are reactive with the gaseous hydrogen halide to form the corresponding halide compounds and/or functional groups of (a); and M being selected such that the heat of formation, $\Delta H_f$ of it hydrated halide, $MX_y \cdot (H_2O)_n$, is governed by the relationship:

$\Delta H_f \geq n \times 10.1$ kilocalories/mole of such hydrated halide compound wherein n is the number of water molecules bound to the metal halide in the metal halide hydrate.

In a preferred aspect, the scavenger as described above, utilizes as the support a material selected from the group consisting of aluminosilicates, alumina, silica, and metal halides, whose halide constituent is the same as the halide of the gas being treated, and whose metal constitutient may for example be calcium, magnesium, or aluminum.

Still another aspect of the invention relates to an apparatus for drying a gaseous hydrogen halide of the formula HX, wherein X is bromine, chlorine, fluorine, or iodine, comprising:
 (a) a vessel containing a bed of the above-described scavenger;
 (b) means for introducing the mixture to the vessel for passage through the bed therein; and
 (c) means for discharging water impurity-depleted gaseous hydrogen halide from the vessel.

Other aspects and features of the invention will be more fully apparent from the ensuing disclosure and appended claims.

BRIEF DESCRIPTION OF THE DRAWING

The single drawing is a schematic representation of a vessel containing a bed of a scavenger according to one embodiment of the invention, and an associated source of a water impurity-containing gaseous hydrogen halide which is purified by passage through such vessel.

DETAILED DESCRIPTION OF THE INVENTION, AND PREFERRED EMBODIMENTS THEREOF

The scavengers according to the present invention comprise:
(A) a support, as more fully described hereinafter; and
(B) associated with the support, one or more members of the group consisting of:
 (1) an active scavenging moiety selected from one or more members of the group consisting:
  (a) metal halide compounds dispersed in the support, of the formula $MX_y$; and
  (b) metal halide pendent functional groups of the formula $-MX_{y-1}$ covalently bonded to the support; wherein M is a y-valent metal; and y is an integer whose value is from 1 to 3; and
 (2) corresponding partially or fully alkylated compounds and/or pendant functional groups, of the metal halide compounds and/or pendent functional groups of (1),
wherein the alkylated compounds and/or pendant functional groups, when present, are reactive with the gaseous hydrogen halide to form the corresponding halide compounds and/or pendant functional groups of (1) above;

M being selected such.that its heat of formation, $\Delta H_f$, of its halide hydrate, $MX_y \cdot (H_2O)_n$, is governed by the relation:

$\Delta H_f \geq n \times 10.1$ kilocalories per mole of metal halide, wherein n is the number of water molecules bound by the metal halide, $MX_y$.

It has been determined that the active scavenging moieties in the above-described scavenger, must meet three interrelated criteria in order to provide highly effective drying of the water impurity-containing gaseous hydrogen halide, and produce an essentially completely water-free gaseous hydrogen halide effluent. These criteria are as follows:

(1) The binding constant for the hydrate removal reaction effected by the active scavenging moiety, denoted as $\Delta H_f$, must be greater than or equal to the quantity 10.1 kilocalories per mole x n;

(2) The vapor pressure of the scavenger per se as well as the non-hydrogen halide reaction product and any intermediates of the water scavenging reaction, must be extremely low; and (3) The active scavenging moiety must be highly dispersed in the scavenger. Each of these criteria is discussed in turn below.

The binding constant criterion is derived from the generalized water binding reaction which is carried out by the active scavenging moieties of the scavenger. This water removal reaction is as follows:

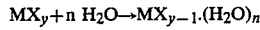

in the case of a non-covalently bonded scavenging compound or, in the case of a pendent functional group covalently bonded to the substrate, the water scavenging reaction is shown below:

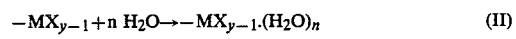 (II)

in which the y-valent metal, M, is anchored to the substrate by covalent bonding.

In each of these reactions (I) and (II), the halide salt active scavenging moiety must form a tightly bound hydrate, in order that this reaction product of the water scavenging reaction has a sufficiently low vapor pressure so that it is not a contaminant of the treated gas stream. It has been determined that such tight binding of hydrates, to satisfy these requirements, must have a heat of formation which is at least equal to the product of the constant, 10.1 kilocalories per mole, times n, the number of water molecules bound to each metal halide moiety in the scavenging reaction. If this criterion is met, the residual water level in the gaseous hydrogen halide stream after treatment is expected to be below 0.1 parts per million by volume.

Metals which are potentially useful in the metal halide active scavenging moieties may include lithium(I), beryllium(II), magnesium(II), calcium(II), strontium-(II), barium(II), cadmium(II), nickel(I), iron(II), iron(III), zinc(II), and aluminum(III). The foregoing list of metal constituents is intended to be illustrative only, it being recognized that other metal species may potentially be employed, if their halide compounds or pendant functional groups are reactive with water in accordance with the above-described binding criterion.

A second criterion for the scavenger, is that its vapor pressure, and the vapor pressure of any non-hydrogen halide reaction products, be suitably low, as for example, less than one part per million by volume in the effluent hydrogen halide gas from the water scavenging treatment. It is apparent in this respect that any significant vapor pressure from the scavenger per se, either the scavenger support, or scavenging reaction products other than the product hydrogen halide, will contaminate the dried product stream and adversely affect the purity of the product. In this respect, it is to be noted that certain metal species, such as aluminum, will form free metal halide compounds which have significant vapor pressure. For this reason, it is desired that when aluminum or similar high vapor pressure metals are utilized, that same be "anchored", i.e., covalently bonded to the support in the scavenger, to reduce their vapor pressure to extremely low levels as required in the practice of the invention.

The last criterion is that the active scavenging moiety be dispersed in the support, if in the form of a metal halide compound, or contained on the surfaces of the support in high concentration, when present in the form of metal halide pendant functional groups.

The halide constituent of the active scavenging moiety, $MX_y$ (metal halide compounds) and/or $-MX_{y-1}$ (metal halide functional groups), is preferably the same halide as in the gaseous hydrogen halide being dried, in order that any disassociation or other occurrence resulting in release of the halide constituent of the active scavenging moiety will not contaminate the hydrogen halide product. Where such disassociation or liberation of the halide is not of concern, the halide may be any species, which is the same as or different from the halide constituent of the hydrogen halide being treated.

The gaseous hydrogen halides which may be treated in the broad practice of the present invention include hydrogen bromide, hydrogen chloride, hydrogen fluoride, and hydrogen iodide.

Scavengers according to the present invention may suitably comprise, in lieu of the active scavenging moieties (i.e., metal halide compounds and/or metal halide pendant functional groups), the corresponding partially or fully alkylated compounds and/or pendant functional groups, as precursors for such active scavenging moieties. Such corresponding partially or fully alkylated compounds and/or pendant functional groups will, in the presence of hydrogen halide, react to form the active scavenging moieties, by displacement reaction wherein the alkyl substituents are removed to form hydrocarbons, and the halide from the hydrogen halide is substituted therefor to form the active scavenging moiety. In other words, the scavenger of the present invention may be provided as an alkylated precursor, which may be "preconditioned" by reaction with hydrogen halide, either prior to placing the scavenger into service, or in situ during the active processing of water-impurity containing gaseous hydrogen halide.

In the latter instance of in-situ conditioning, it will of course be recognized that the hydrocarbon formed as a reaction by-product will produce significant contamination of the hydrogen halide, so that the effluent during this initial in situ conditioning step will not be of the high purity subsequently attained when the conditioning step has been completed. Accordingly, it may be necessary to divert the conditioning portion of such gas from the in situ conditioning step to waste or other purification to remove the hydrocarbon species therefrom. Relevant to the foregoing is the requirement that when high purity hydrogen halide product is desired, the conditioning step preferably should have previously been carried out essentially to completion, so that hydrocarbon contaminants are in turn essentially absent from the dried product gas. For "post-conditioning" operation, the vapor pressure of hydrocarbons in the dried hydrogen halide product should be less than 1 part per million, preferably less than 0.1 part per million, and most preferably less than 0.01 part per million, by volume.

The precursor compounds and/or pendant functional groups in the scavenger may be partially or fully alkylated, i.e., the metal constituent of such moieties may have all of its substituents present as alkyl and halide radicals, or only as alkyl hydrocarbon radicals.

Illustrative of suitable precursor compounds, reactable with the hydrogen halide to form active scavenging compounds, are butyl lithium, dibutyl magnesium, methyl calcium chloride, etc.; illustrative precursor pendant functional groups include alkyl- groups and/or halogens attached to aluminum. In the presence of gaseous hydrogen halide, the alkyl-substituted metal compounds and metal functional groups will be converted to the corresponding fully halogenated compounds and functional groups, thereby forming the active scavenging moieties in the scavengers. In the precursor compounds and/or functional groups, the alkyl substituent may be an alkyl hydrocarbon radical containing from 1 to 12 carbon atoms, preferably from 1 to 8 carbon atoms, and most preferably from 1 to 4 carbon atoms.

The active scavenging moieties, or their precursors, may be applied to the support in any suitable manner which is effective to provide a dispersion of free active scavenging compounds and/or suitably high surface concentrations of active scavenging pendant functional groups. Where the active scavenging moiety is present as a free compound, the compound or its precursor may for example be dispersed throughout the support matrix in the form of particulates or agglomerates, or applied as a film or-plating on the support, or otherwise localized in pores of the support when porous materials are utilized as a substrate. Free active scavenging compounds thus may be physically adsorbed on the support surfaces, or co-precipitated with the support material from a common solvent for both the support and such compounds, or in any other suitable manner.

A most preferred free scavenging compound is magnesium halide, e.g., magnesium chloride for drying of hydrogen chloride, magnesium bromide for drying of hydrogen bromide, etc. For such active scavenging compounds, the scavenger is suitably formed by first dispersing an organometallic precursor, viz., the alkyl magnesium compound, on the support, following which the unconditioned scavenger is exposed to hydrogen halide to substitute the halide substituents for the alkyl functional groups.

The supports useful in the scavengers of the present invention include any suitable materials which are compatible with the gas streams being purified of water impurity, the reaction products of the impurity removal, and any intermediates involved with conditioning or otherwise preparing the scavenger, and which are stable under the conditions of use.

Illustrative materials which may be potentially useful in the broad practice of the invention include materials such as aluminosilicates, alumina, silica, and metal halides. As used herein, the term "aluminosilicates" means a support composition including the elements aluminum, silicon, and oxygen in its structure, such as molecular sieves; such aluminosilicates may be natural or synthetic in character.

In the case of aluminum, or other metals whose free halide compounds have a vapor pressure rendering them less suitable as active scavenging moieties of te scavenger, and which hence must be "anchored" to the support by covalently bonding, the support may be of any useful material which suitably anchors the pendant functional groups so that they are maintained on the substrate during purification of the hydrogen halide. Illustrative of suitable materials for such metal-containing pendant functional groups are materials having surface hydroxyl functional groups which are reactive with source compounds for the pendant groups. Examples of such anchoring supports are metal oxides as described above, i.e., alumina, silica, and aluminosilicates, with acidic high surface area alumina being a preferred support for drying of hydrogen chloride, hydrogen bromide, and hydrogen iodide.

In the case of hydrogen fluoride as the water impuritycontaining gas to be dried, the only practically useful support-materials are metal halides, preferably metal fluorides. The aluminosilicates, alumina, and silica are unsuitable as supports in the treatment of hydrogen fluoride, since they will be chemically attacked by the hydrogen fluoride.

Among the metal halides useful for supports for hydrogen fluoride treatment, as well as in treatment of other hydrogen halide gases, are halides of calcium, magnesium, and aluminum, with magnesium generally being preferred. For reasons of preserving the high purity of the gas being dried, the halide constituent of the metal halide support preferably is the same as the halide of the hydrogen halide being treated.

Relative to the possible use of molecular sieves as supports for the scavengers of the present invention, it was indicated herein in the "Background of the Invention" section hereof that molecular sieves have been used in the prior art to adsorb moisture from gaseous hydrogen chloride, which has the disadvantage that hydrogen chloride molecules are generally competitive with the water molecules for molecular sieve sorption sites. The practice of the present invention, however, when involving the use of active scavenging moieties and/or their precursors, overcomes these deficiencies; to the extent that water is adsorbed by the molecular sieve support, the water impurity is localized for gettering by the active scavenging compounds of scavengers according to the invention.

The characteristics of preferred supports which are particularly useful in scavengers according to the invention include (a) high surface area, for example the surface area in the range of from about 50 to about 1000 square meters of surface area per gram of support, (b) high porosity, when the support is porous, such as a significant porosity from pores with a diameter in the range of from about 3 to about 200 Angstroms, and (c) good thermal stability, e.g., thermally stable at temperatures up to about 250 degrees centigrade.

The scavengers of the invention may be readily used in particulate form, as provided in a scavenger bed, in which the scavenger comprises particulate support materials with which the precursor and/or active scavenging moieties are associated. The water impurity-containing hydrogn halide gas is purified by flow through the scavenger bed, thereby providing a highly efficient removal system for the substantially complete elimination of water from the hydrogen halide gas being treated.

Suitable scavengers according to the invention, depending on the choice of active scavenging moiety and/or precursors therefor, may variously provide water removal capacity of from about 0.5 to 20 liters gaseous water per liter of bed of the scavenger.

In some instances where the water impurity-removing reaction is highly exothermic in character, it may be desirable to utilize a removal efficiency of from about 2 to 10 liters gaseous water per liter of that of the scavenger. The water removal capacity of the bed may of course be readily adjusted to a particular desired level by controlling the loading of the active scavenger moiety and/or its precursor on such supports, in the impregnation or other forming operation by which the active scavenging moiety and/or its precursor is applied to the support.

Set forth below is an illustrative description of a scavenger according to the present invention, in which the active scavenging moiety comprises pendant functional groups of a metal whose free halide has a high vapor pressure and thus must be anchored to the support material. In this discussion, bromine is utilized as the illustrative halide being purified, and the metal in the pendant functional groups is represented as a trivalent or tetravalent metal which is bound by oxo bridges, —O—, to the support, the oxo bridges being derived from surface hydroxyl functionalities which have been reacted with organometallic compounds to form the pendant scavenging functional groups.

In this illustrative hydrogen bromide purification system, the substrate has bonded thereto a plurality of pendant functional groups selected from those of the formula (i) $-O_aMR_b$, wherein:

a is an integer whose value is 1 or 2;

b is an integer whose value is from 1 to 3;

M is a trivalent or tetravalent metal; and

R is a hydrocarbyl radical; and/or (ii) $-O_aMBr_b$.

In the aforementioned formula, M preferably is a metal selected from the group consisting of aluminum, boron, silicon, and titanium, with aluminum generally being most preferred.

The hydrocarbyl radical, R, is any suitable hydrocarbon radical containing hydrogen and carbon atoms, which may be bonded to the metal atom, and is displaceable from the pendant functional group by bromine upon contacting of the scavenger with hydrogen bromine. Among the hydrocarbyl radicals which may be employed are alkyl, aryl, aralkyl, and alkaryl radicals, optionally substituted with any substituents which do not preclude the displaceability of the radical from the metal atom by bromine during the contacting of the scavenger with hydrogen bromide. Among the foregoing hydrocarbyl substituents, alkyl radicals are preferred, most preferably alkyl radicals containing from 1 to 12 carbon atoms.

Depending on the trivalent or tetravalent character of the metal in the pendant group, from 1 to 3 hydrocarbyl radicals may be present thereon. The scavenger may be provided in such form, i.e., comprising pendant functional groups of the form $-O_aMR_b$, and placed into service for drying of water-containing hydrogen bromide, whereby bromine atoms from the hydrogen bromide will displace the hydrocarbyl radicals, with the radicals thereupon forming the corresponding protonated compounds, e.g., alkyl radicals will form the corresponding alkanes. In this fashion, the scavenger may be "conditioned" to provide the bromine atom-containing pendant groups which serve as the active scavenging sites in the system, so that the scavenging sites are prepared in situ in actual service. Alternatively, the $-O_aMR_b$ pendant functional groups may be prereacted with a stoichiometric amount of hydrogen bromide, to yield the active scavenging pendant functional groups, prior to placing the scavenger in service.

As a further alternative, the scavenger may contain both $-O_aMR_b$ and $-O_aMBr_b$ groups, whereby active scavenging sites are initally provided, with the remaining $-O_aMR_b$ groups being brominated to form the active scavenging groups during actual processing of wet hydrogen bromide.

The water scavenging reaction which is carried out by the active scavenging pendant functional groups in this illustrative embodiment of the invention corresponds to that set out below in formula (1) for the corresponding free metal bromide compound $$2MBr_3 + 3H_2O \rightarrow M_2O_3 + 6HBr, \quad (1)$$

wherein M is a trivalent metal such as aluminium.

Aluminium is a highly preferred metal in the scavenging moiety for this water gettering reaction. The equilibrium water concentration for reaction (1), in hydrogen bromide at one atmosphere pressure, is $1.6 \times 10^{-17}$ atmosphere, substantially less than one part-per-million (ppm) by volume. This reaction, in which aluminum tribromide is the active scavenger, is highly exothermic in character, having a heat of reaction of 58 kcal per mole.

Although the metal bromide of itself is highly efficient in removing water from hydrogen bromide, such bromide compounds generally have sufficient volatility to constitute a contamination problem in applications where high purity hydrogen bromide is required, as in the aforementioned semiconductor manufacturing applications.

This problem, viz., the high volatility of metal bromide compounds, is overcome by immobilizing metal bromide functional groups on a suitable matrix. Using aluminum as the illustrative metal employed to form metal bromide pendant functional groups, an example of the formation of a scavenger according to the present invention utilizing pendant functional aluminum-containing groups for drying of hydrogen bromide is described below.

Using a trialkyl aluminum compound, $R_3Al$, as a metal source compound, and a metal oxide substrate, represented as $HOM'[O^-]_3$, as the support surface to which the pendant group is to be applied, the following reaction may be carried out:

$$R_3Al + HOM'[O^-]_3 \rightarrow R_2AlOM'[O^-]_3 + RH \quad (2)$$

In the above reaction (2), M' represents the metal constituent of the metal oxide surface, which may be aluminum, so that the metal oxide substrate is alumina, and R may be an alkyl radical such as methyl.

The metal oxide substrate suitably contains a plurality of free hydroxyl (-OH) functional groups, preferably at a high concentration, as reactive sites for anchoring the active scavenging pendant functional groups. Acidic high surface alumina is preferred as an anchoring support for pendant functional groups because it contains such free hydroxyl groups at high concentration, and provides a high surface area and good thermal stability which renders it especially suitable for hydrogen bromide purification applications. Further, alumina has an additional advantage, in that it is sorptively selective for water, and thus enhances water removal capability when utilized as a support.

While metal oxide surfaces have been illustratively described, it will be appreciated that any support materials having surface hydroxyl groups may potentially be useful as substrates for the pendant functional group-comprising scavenger.

Referring again to reaction (2), the alkyl aluminium-functionalized substrate product is, as mentioned, a precursor which may be either further functionalized in situ to provide active scavenging sites during hydrogen bromide purification, or pre-reacted, i.e., brominated or protonated with hydrogen bromide before entering HBr drying service. The bromination reaction is shown as reaction (3) below.

$$R_2AlOM'[O^-]_3 + 2HBr \rightarrow 2RH + Br_2AlOM'[O^-]_3 \quad (3)$$

Under working conditions, i.e., in contacting of the scavenger with the water impurity-containing hydrogen bromide, the brominated substrate, $Br_2AlOM'[O^-]_3$, is expected to hydrolyze according to the following reaction:

$$Br_2AlOM[O^-]_3 + 2H_2O \rightarrow (HO)_2AlOM[O^-]_3 + 2HBr \quad (4)$$

The reaction products of the hydrolysis reaction are hydrogen bromide, and the substrate comprising the water impurityderived hydroxyl groups bound to the aluminum constituent of the pendant group thereon. Thus, the water is effectively gettered, and the only volatile product of the reaction is the desired product hydrogen bromide.

Although in the reaction schemes of reactions (2)–(4), the aluminium is represented as being singly bound to the metal M' of the substrate by an interposed oxo (—O—) group, it is within the purview of the invention to utilize aluminium, or any other suitable metal, which is doubly bound to the substrate by such oxo groups. In the case of aluminium, triply bound aluminium moieties may be present with single and/or doubly bound aluminium species, however it will be appreciated that such triply bound aluminium is not capable of removing water with the production of hydrogen bromide.

The single drawing shows an apparatus which may be usefully employed for removal of water impurity from gaseous hydrogen halides in accordance with the invention.

The vessel 10 shown in the drawing comprises an upper cylindrical block 12 which is joined to a lower cup-like receptacle 14 by means of the circumferentially extending weld 16. In the lower portion of the receptacle 14 is disposed a bed 18 of the scavenger according to the present invention.

The vessel is provided with means for introducing water impurity-containing gaseous hydrogen halide into the vessel for contact therein with the scavenger bed 18, comprising inlet conduit 20 which is provided at its exterior end with a suitable fitting 22 for coupling with a feed line 32 from wet hydrogen halide source 30.

As shown, conduit 20 extends generally horizontally through the block 12 toward the center thereof, and depends downwardly from such center portion of the block into the lower part of the receptacle 14, whereby the lower portion of the conduit is in contact with the scavenger bed 18. This lower portion of conduit 20 is provided with a plurality of perforation openings 34, by means of which wet hydrogen halide entering the vessel in the conduit is flowed outwardly and upwardly through the scavenger bed, with the water therein being gettered as described hereinabove.

The resulting water impurity-depleted hydrogen halide emerging from the bed is collected in the space thereover and flows in discharge conduit 24, provided with connecting fitting 26 at its outer end, into effluent line 28, for flow to downstream end-use processing, as desired.

The features and advantages of the present invention are more fully shown with reference to the following examples.

EXAMPLE I 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 1.6M BuLi (Aldrich Chemical Co.) in hexanes.

The solvent was removed from the bed at 65° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HCl gas (Matheson Gas Products) was introduced into the nitrogen stream. The HCl was added until the exit gas was acid (as determined by pH paper). The HCl gas flow was increased to about 200 milliliters per minute and the nitrogen gas flow was turned off. Pure HCl was passed through the device for 30 minutes.

The HCl gas was then turned off and the nitrogen gas turned on. The system was flushed with nitrogen for at least 5 hours.

The HCl drier was transferred in a nitrogen glove bag to the purifier vessel that would normally be used.

EXAMPLE II 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 20 W/W % Bu$_2$Mg (Lithium Corporation of America) in heptanes.

The solvent was removed from the bed at 90° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HCl gas (Matheson Gas Products) was introduced into the nitrogen stream. The HCl was added until the exit gas was acid (as determined by pH paper). The HCl gas flow was increased to about 200 milliliters per minute and the nitrogen gas flow was turned off. Pure HCl was passed through the device for 30 minutes.

The HCl gas was then turned off and the nitrogen gas turned on. The system was flushed with nitrogen for at least 5 hours.

The HCl drier was transferred in a nitrogen glove bag to the purifier vessel that would normally be used.

EXAMPLE III 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 1M triethylaluminum (Aldrich Chemical Co.) in hexanes.

The solvent was removed from the bed at 65° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HCl gas (Matheson Gas Products) was introduced into the nitrogen stream. The HCl was added until the exit gas was acid (as determined by pH paper). The HCl gas flow was increased to about 200 milliliters per minute and the nitrogen gas flow was turned off. Pure HCl was passed through the device for 30 minutes.

The HCl gas was then turned off and the nitrogen gas turned on. The system was flushed with nitrogen for at least 5 hours.

The HCl drier was transferred in a nitrogen glove bag to the purifier vessel that would normally be used.

EXAMPLE IV

The efficacy of a scavenger bed constructed in accordance with Example I is evaluated by flowing therethrough a stream of gaseous hydrogen chloride containing 50 parts per million (ppm) water by volume, at a flow rate of 700 volumes of the wet hydrogen chloride gas per volume of scavenger bed per hour. The bed volume of the scavenger bed is 30 milliliters.

The effluent from the bed is measured for moisture content by an electrolytic hydrometer, wherein rhodium wires coated with phosphorus pentoxide are employed, which in the presence of water form phosphoric acid, thereby generating a current from which the water concentration of the gas is determined. The effluent from the bed measured by such technique has a moisture content of less than 2 ppm water.

EXAMPLE V

Capacity of a scavenger bed constructed in accordance with Example I is measured by flowing therethrough a stream of wet nitrogen. The wet nitrogen is produced by bubbling nitrogen gas through a water tank and collecting the wet gas for passage to the scavenger bed.

The gas after flow through the bed is measured by means of a pH meter. The resulting pH determination is monitored as a function of time until breakthrough occurs, i.e., when the hydrogen ion concentration of the effluent gas suddenly markedly increases to a constant concentration corresponding to the hydrogen content of the influent gas which is fed to the bed.

Based on the time from initial operation to breakthrough, the water concentration in the influent gas to the bed, and the amount of scavenger in the bed, the water removal capacity of the bed is determined as being on the order of 4–5 liters gaseous water per liter of scavenger bed.

EXAMPLE VI 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 1.6M BuLi (Aldrich Chemical Co.) in hexanes.

The solvent was removed from the bed at 65° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HBr gas (Matheson Gas Products) was introduced into the nitrogen stream. The HBr was added until the exit gas was acid (as determined by pH paper). The HBr gas flow was increased to about 200 milliliters per minute and the nitrogen gas flow was turned off. Pure HBr was passed through the device for 30 minutes.

The HBr gas was then turned off and the nitrogen gas turned on. The system was flushed with nitrogen for at least 5 hours.

The HBr drier was transferred in a nitrogen glove bag to the purifier vessel that would normally be used.

EXAMPLE VII 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 20 W/W % Bu$_2$Mg (Lithium Corporation of America) in heptanes.

The solvent was removed from the bed at 90° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HBr gas (Matheson Gas Products) was introduced into the nitrogen stream. The HBr was added until the exit gas was acid (as determined by pH paper). The HBr gas flow was increased to about 200 milliliters per minute and the nitrogen gas flow was turned off. Pure HBr was passed through the device for 30 minutes.

The HBr gas was then turned off and the nitrogen gas turned on. The system was flushed with nitrogen for at least 5 hours.

The HBr drier was transferred in a nitrogen glove bag to the purifier vessel that would normally be used.

EXAMPLE VIII 500 milliliters of acidic alumina (150 mesh, surface area 155 m$^2$/g) (Aldrich Chemical Co.) was placed in a stainless steel sample cylinder. The vessel was wrapped with heating tape and the alumina was heated to 190° C. under a stream of nitrogen overnight. The bed was then allowed to cool and the bed was flooded with 1M BuLi (Aldrich Chemical Co.) in hexanes.

The solvent was removed from the bed at 65° C. initially to remove the bulk of the solvent. The temperature was raised to 125° C. and held there for longer than 10 hours. The bed was then cooled to room temperature.

The nitrogen flow through the system was increased to about 2 liters per minute. The exit gas was run through a saturated sodium bicarbonate trap. About 20 milliliters per minute of HBr gas (Matheson Gas Products) was introduced into the nitrogen stream. The HBr was added until the exit gas was acid (as determined by pH paper). The HBr gas flow was increased to about 200 milliliters per minute and the nitrogen gas flow was turned off. Pure HBr was passed through the device for 30 minutes.

The HBr gas was then turned off and the nitrogen gas turned on. The system was flushed with nitrogen for at least 5 hours.

The HBr drier was transferred in a nitrogen glove bag to the purifier vessel that would normally be used.

EXAMPLE IX

A 100 milliliter sample of scavenger, prepared according to the procedure of Example VI, is placed in a stainless steel vessel. One hundred liters of nitrogen is passed through a bed at a flow rate of 200 milliliters per minute. The effluent gas is passed through a deionized water trap. The concentration of aluminium is measured by ion coupled plasma spectroscopy, and found to be the same as the aluminium concentration in the deionized water trap; in both cases, the concentration of aluminum is less than one-per-million (ppm) by volume.

EXAMPLE X

A scavenger was prepared according to the procedure of Example VI. Hydrogen bromide with an initial water concentration of 40 ppm by volume is flowed through a bed of the scavenger at a space velocity of 700 volumes of wet hydrogen bromide gas per volume of bed per hour. Water concentration in the effluent stream from the bed is measured using a long path infrared technique. This measurement shows that the inlet water concentration is reduced to less than 1 ppm by volume by the scavenger.

EXAMPLE XI

A 500 milliliters Whitey sample cylinder was packed with reagent $CaF_2$ powder. The powder bed was heated with a nitrogen stream flowed therethrough at a temperature of 200° C. overnight. The bed was then cooled to room temperature, and flooded with 1M triethylaluminum in hexanes. The solvent was removed at 120° C. under a stream of nitrogen.

The bed was then cooled, with the flow of (unheated) nitrogen gas being increased to about 4 liters per minute. The exit gas from the bed was passed through a sodium carbonate scrubber. Next, the bed was reacted with HF gas (20 milliliters/min., mixed with the nitrogen carrier gas). The flow of HF was maintained until the exit gas was acidic.

The nitrogen carrier gas was then turned off and the HF flow rate was increased to 200 milliliters/min. This HF flow rate was maintained for about thirty minutes. The HF flow was then turned off and the nitrogen flow resumed. The bed was flushed with nitrogen until the exit gas was no longer acidic.

The purifier material was transferred in a glove bag flushed with nitrogen into the final purifier vessel.

EXAMPLE XII

The efficacy of a scavenger formed by the procedure of Example XI above is evaluated by providing 30 milliliters of the scavenger as a bed in a purifier vessel through which wet hydrogen fluoride gas, containing 50 parts per million by volume gaseous water, is flowed. The effluent water concentration in the treated gas, at a feed gas flow rate of 700 volumes of wet hydrogen fluoride gas per volume of bed per hour, is determined using a long path infrared detector (a Sum-X IR detector, equipped with sapphire windows), using a path length of aproximately 1 meter. The water concentration of the effluent is below the detection limit of the infrared detector, i.e., below 1 part-per-million by volume.

EXAMPLE XIII

The procedure of Example XII is carried out as described therein.

Flow is continued until breakthrough of the water front in the bed occurs. From the amount of time to breakthrough, the amount of scavenger in the bed, and the amount of water with which the scavenger is contacted, the capacity of the scavenger bed is determined to exceed 2 liters gaseous water per liter of scavenger bed.

While preferred embodiments of the invention have been described in detail, it will be appreciated that other variations, modifications and embodiments are possible, and all such variations, modifications and embodiments are to be regarded as being within the spirit and scope of the present invention.

What is claimed is:

1. A scavenger, having utility for drying a gaseous hydrogen halide of the formula HX, wherein X is selected from the group consisting of bromine, chlorine, fluorine, and iodine, to remove water impurity therefrom and produce an essentially completely water-free gaseous hydrogen halide effluent characterized by residual water concentration of below 0.1 part per million by volume (ppm), said scavenger comprising:
    (a) a support; and
    (b) associated with said support an active scavenging moiety selected from one or more members of the group consisting of:
        (i) metal halide compounds dispersed in the support, of the formula $MX_y$;
        (ii) metal halide pendant functional groups, of the formula $-MX_{y-1}$, covalently bonded to the support,
   wherein:
    M is a y-valent metal selected from the group consisting of lithium (I), beryllium (II), magnesium (II), calcium (II), strontium (II), barium (II), cadmium (II), nickel (I), iron (II), iron (III), zinc (II), and aluminum (III);
    y is an integer whose value is from 1 to 3; and
    the active scavenging moiety metal halide compounds and/or metal halide pendant functional groups have been formed by reaction of corresponding partially or fully akylated compounds and/or pendant functional groups, with the gaseous hydrogen halide, to form the ative scavenging moiety metal halide compounds and/or metal halide pendant functional groups;
    the vapor pressure of the support is less than 1 ppm;
    M is selected such that the heat of formation of its hydrated halide, $MX_y \cdot (H_2O)_n$, is greater than or equal to 10.1 kilocalories per mole of such hydrated halide compound for each hydrated water molecule, wherein n is the number of water molecules bound to the metal halide in the metal halide hydrate;
    with the proviso that the support is formed of a material which is both chemically and physically different from said active scavenging moiety.

2. A scavenger according to claim 1, wherein the reaction product of the active scavenging moiety and said water impurity is selected from the group consisting of metal halide hydrate compounds and pendant functional groups, and metal oxide compounds and pendant functional groups.

3. A scavenger according to claim 1, wherein the vapor pressure of non-hydrogen halide reaction products of the active scavenging moiety and said water impurity is less than 1 part per million by volume.

4. A scavenger according to claim 1, wherein M is selected from the group consisting of lithium, magnesium, and aluminum.

5. A scavenger according to claim 1, wherein said support is formed of an inorganic material.

6. A scavenger according to claim 1, wherein said support is formed of a material which is stable in said process, and selected from the group consisting of aluminosilicates, alumina, silica, and metal halides whose halide constituent is the same as the halide of the hydrogen halide being dried.

7. A scavenger according to claim 1, wherein said support is a metal halide whose halide constituent is the same as the halide in the hydrogen halide being dried, and whose metal constituent is selected from the group consisting of calcium, magnesium, and aluminum.

8. A scavenger according to claim 1, having a water removal capacity of from about 0.5 to about 20 liters gaseous water per liter of a bed thereof.

9. An apparatus for drying a gaseous hydrogen halide of the formula HX, wherein X is selected from the group consisting of bromine, chlorine, fluorine, and iodine, to remove water impurity therefrom, comprising:

(a) a vessel containing a bed of a scavenger according to claim 1;
(b) means for introducing the water impurity-containing gaseous hydrogen halide to said vessel for passage through said bed therein; and
(c) means for discharging water impurity-depleted gaseous hydrogen halide from said vessel.

* * * * *

UNITED STATES PATENT AND TRADEMARK OFFICE
CERTIFICATE OF CORRECTION

PATENT NO. : 4,853,148

DATED : August 1, 1989

INVENTOR(S) : Glenn M. Tom & Duncan W. Brown

It is certified that error appears in the above-identified patent and that said Letters Patent is hereby corrected as shown below:

Column 2, line 65, change "$MX_y \cdot (H_{22}O)_n$" to --$MX_y \cdot (H_2O)_n$--.

Column 3, line 28, change "it" to --its--.

Column 7, line 38, change "puritycontaining" to --purity-containing--.

Column 10, line 3, change "$HOM'[O^{O-}]_3$" to --$HOM'[O^-]_3$--.

Column 10, line 53, change "impurityderived" to --impurity-derived--.

Signed and Sealed this

Seventeenth Day of March, 1992

*Attest:*

HARRY F. MANBECK, JR.

*Attesting Officer*  *Commissioner of Patents and Trademarks*